(12) United States Patent
Bax

(10) Patent No.: US 6,732,083 B2
(45) Date of Patent: May 4, 2004

(54) VALIDATION OF NEAREST NEIGHBOR CLASSIFIERS

(76) Inventor: Eric T Bax, P.O. Box 60543, Pasadena, CA (US) 91116-6543

( * ) Notice: Subject to any disclaimer, the term of this patent is extended or adjusted under 35 U.S.C. 154(b) by 599 days.

(21) Appl. No.: 09/790,124

(22) Filed: Feb. 21, 2001

(65) Prior Publication Data

US 2002/0004791 A1 Jan. 10, 2002

Related U.S. Application Data

(60) Provisional application No. 60/184,459, filed on Feb. 22, 2000.

(51) Int. Cl.[7] .............................................. G06F 15/18
(52) U.S. Cl. ............................ 706/12; 706/20; 711/173
(58) Field of Search .................... 706/20; 711/120–123; 713/1–601

(56) References Cited

U.S. PATENT DOCUMENTS 6,298,351 B1 * 10/2001 Castelli et al. ............... 707/102
2002/0054694 A1 * 5/2002 Vachtsevanos et al. ...... 382/111

OTHER PUBLICATIONS

Distribution–Free Inequalities for the Deleted and Holdout Estimates, L. Devroye and T. Wagner, published in IEEE Transactions on Information Theory, vol. 25, 1979, pp. 202–207.*

Validation of Nearest Neighbor Classifiers, Eric Bax, published in IEEE Transactions on Information Theory, vol. 46, No. 7, 2000, pp. 2746–2752.*

The Uniform Convergence of Nearest Neighbor Regression Function Estimators and Their Application in Optimization, Luc P. Devroye, IEEE Transactions On Information Theory, vol. IT–24, No. 2, Mar. 1998, pp. 142–151.*

Lower Bounds for Bayes Error Estimation, Andres Antos, Luc Devroye, Laszio Gyorti, Fellow, IEEE, IEEE Transactions on Pattern Analysis and Machine Intelligence, vol. 21, No. 7, Jul. 1999, pp. 643–645.*

* cited by examiner

*Primary Examiner*—Anil Khatri
*Assistant Examiner*—Michael B. Holmes

(57) ABSTRACT

A computer-based system computes a probabilistic bound on the error probability of a nearest neighbor classifier as follows. A subset of the examples in the classifier is used to form a reduced classifier. The error frequency of the reduced classifier on the remaining examples is computed as a baseline estimate of the error probability for the original classifier. Additionally, subsets of the examples outside the reduced classifier are combined with the reduced classifier and applied to the remaining examples in order to estimate the difference in error probability for the reduced classifier and error probability for the original classifier.

4 Claims, 1 Drawing Sheet

VALIDATION OF NEAREST NEIGHBOR CLASSIFIERS

CROSS-REFERENCE TO RELATED APPLICATIONS

This invention relates to Provisional Application Ser. No. 60/184,459, filed Feb. 22, 2000. The contents of the application are incorporated by reference.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

A classifier is a process or device that categorizes inputs. For example, a quality-control classifier may take measurements of an item as inputs and return a result of "defective" or "not defective." Another example could be an iceberg-detecting classifier that takes as input a satellite image of an ocean area and produces as output either "iceberg" or "no iceberg."

As another example, consider an email router system designed to be deployed in a crisis relief situation. The system users can be divided into groups according to interests, including "medical", "food", and "transport." For each group, a classifier could be designed to determine whether an input email is of interest to the group. When an email is received by the system, each classifier can be applied, and the classifier results can determine which groups are sent the email. For example, an email detailing when blood supplies will arrive at an airport should be routed to the members of the "medical" and "transport" groups.

A "nearest neighbor" classifier is based on a set of inputs for which the categories are known. These input-output pairs are called the "in-sample" examples. The nearest neighbor classifier also includes a means of determining some measure of distance between inputs. When an "out-of-sample" input is encountered, the nearest neighbor classifier determines which in-sample example has the closest input and returns the corresponding output.

For the email router example, a nearest neighbor classifier for the medical group could consist of email messages from previous crises, with each message categorized as either "medically interesting" or "not medically interesting." These are the in-sample examples. The distance measure between pairs of emails could be based on the number of words shared by the emails. To determine whether an out-of-sample email should be routed to medical personnel, the classifier would find the closest in-sample email. If that in-sample email is categorized as "medically interesting", then the classifier would categorize the out-of-sample email as "medically interesting."

Accuracy is a major concern in the development, selection, and decision whether to deploy a classifier. The probability that a classifier will incorrectly classify an input drawn at random is known as the expected error rate. (The expected error rate is also called the error probability.) Methods to estimate the expected error rate are called validation techniques. Effective validation techniques are needed so that classifiers can be selected for low expected error rates and so that classifier results can be used with appropriate levels of trust.

Now we describe prior art. One method to validate a nearest neighbor classifier is to remove some examples from the in-sample data to form a validation data set, use the remaining examples to form the classifier, then use the error rate of the classifier over the validation data as an estimate of the expected error rate. The drawback of this method is that the resulting classifier does not include the validation examples. On average, having fewer examples in a classifier results in a higher expected error rate. Hence, the primary goal of forming an accurate classifier suffers in order to accomplish the secondary goal of assessing the accuracy.

There are two prior validation techniques to obtain probabilistic bounds on the expected error rates for classifiers formed using all in-sample examples. Both methods are based on using in-sample examples to validate classifiers based on subsets of the remaining in-sample examples, then bounding the difference in error rates between the classifiers consisting of subsets of the in-sample examples and classifiers consisting of all in-sample examples. One method is based on the "leave-one-out" estimate, which is the error rate of applying the classifier consisting of the remaining in-sample examples to each in-sample example. This method is described in "Distribution-Free Inequalities for the Deleted and Holdout Estimates" by L. Devroye and T. Wagner, published in IEEE Transactions on Information Theory, Volume 25, 1979, pages 202 to 207, which is included in its entirety by reference. The other method is based on the "holdout" estimate, which is the error rate of applying the classifier consisting of a subset of the in-sample examples to the remaining in-sample examples. This method is also described in the paper "Distribution-Free Inequalities for the Deleted and Holdout Estimates."

BRIEF SUMMARY OF THE INVENTION

The invention is a computer-based system to obtain probabilistic bounds on the expected error rate for a nearest neighbor classifier. The estimate used in the bound is an extension of the holdout estimate. The difference in error rates between the holdout classifier and classifier consisting of all in-sample examples is estimated using truncated inclusion and exclusion.

The bounds are computed as follows. Partition the in-sample examples into validation examples and remaining examples. Form a reduced classifier from the remaining examples. Use the error rate of the reduced classifier over the validation examples to estimate the expected error rate of the reduced classifier. Then estimate the difference in expected error rates between the reduced classifier and the full classifier as follows. Partition the validation examples into two "holdout" subsets. Then use each holdout subset to estimate the difference in expected error rate due to including the other holdout subset in the full classifier.

The bound is based only on the examples that comprise the classifier. Thus, all available examples can be used in the classifier; no examples need to be withheld to compute error bounds. Also, the probability that the prior "leave-one-out" and "holdout" error bounds are weaker than those produced by the process described here is shown to be large in "Validation of Nearest Neighbor Classifiers" by Eric Bax, published in IEEE Transactions on Information Theory, Volume 46, Number 7, 2000, pages 2746 to 2752, which is included in its entirety by reference.

DETAILED DESCRIPTION OF THE INVENTION

Figure 1:
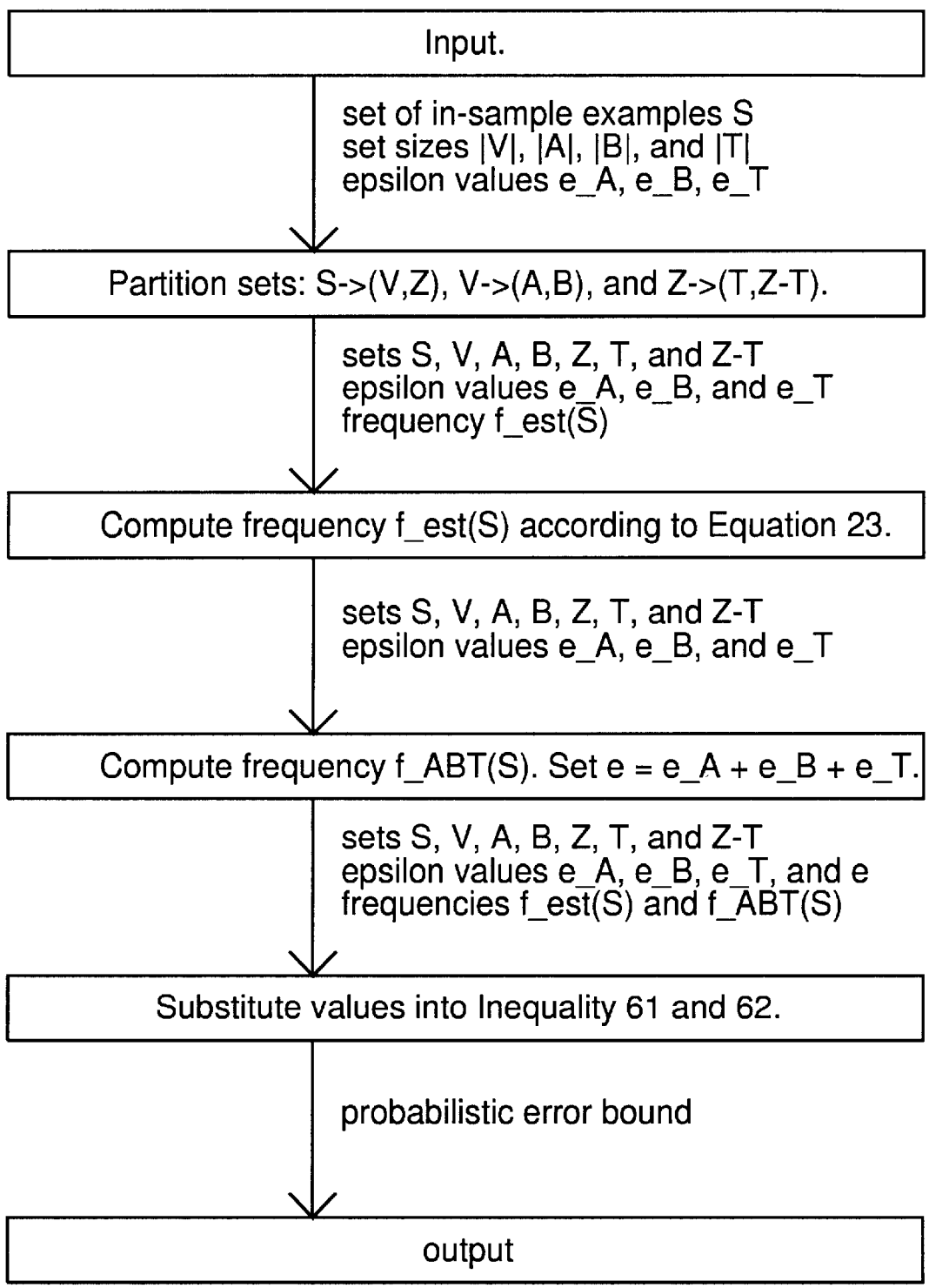
FIG. 1 is a flowchart that illustrates some steps in a process performed by the system that is the invention; notes in boxes describe process steps, and notes beside arrows describe data transferred between steps.

The first subsection presents the mathematical framework surrounding the invention. The next subsection explains how to produce the error bounds. The following subsection details how to use unlabelled inputs to strengthen the bounds and explains a process to bound the error rate over out-of-sample data with known inputs.

Framework

Consider the following machine learning framework. There is a joint input-output distribution. For example, the input distribution could consist of typical satellite images of the North Atlantic Ocean, and the output could be 1 if the image contains a large iceberg and 0 otherwise.

We have a set of in-sample data examples, $S=\{(x_1, \theta_1), \ldots, (x_n, \theta_n)\}$, with each example drawn i.i.d. from the joint input-output distribution. We will use a nearest neighbor classifier, composed of the in-sample examples and a distance metric, to classify the inputs of test examples drawn i.i.d. from the input-output distribution. For each test input, the classifier returns the output corresponding to the closest in-sample input. The test error rate is the fraction of test inputs for which the classifier and the test output disagree. The underlying error rate, $L_n$, is the expected test error rate over the input-output distribution. (We also refer to $L_n$ as the error probability.) The average of $L_n$ over all size $n$ in-sample data sets drawn from the input-output distribution is $R_n$. To make the definitions of $L_n$ and $R_n$ explicit, let $y_{NN}$ be the output of the nearest neighbor classifier, and let y be the test output. Then $$L_n = Pr\{y_{NN} \neq y | S\} \qquad (1)$$

and $$R_n = E_S L_n = Pr\{y_{NN} \neq y\}. \qquad (2)$$

(We use subscripts to denote the distributions over which expectations are taken.) The bounds produced by this invention apply to $L_n$, the error rate of the classifier at hand, not to $R_n$, the average error rate over randomly drawn classifiers.

Bounds

Recall that $S=\{(x_1, \theta_1), \ldots, (x_n, \theta_n)\}$ is the set of in-sample examples, with each example drawn i.i.d. from the joint input-output distribution. Without reference to the examples, choose positive values $|Z|$ and $|V|$ such that $|S|=|Z|+|V|$, and choose positive values $|A|$ and $|B|$ such that $|V|=|A|+|B|$. Partition S into a validation set $V=\{(x_1, \theta_1), \ldots, (x_{|V|}, \theta_{|V|})\}$ and a remaining set $Z=S-V$. Partition V into "holdout" sets $A=\{(x_1, \theta_1), \ldots, (x_{|A|}, \theta_{|A|})\}$ and $B=V-A$. Define $C_Z$, $C_{Z \cup A}$, $C_{Z \cup B}$, and $C_S$ to be the classifiers composed of the sets in the subscripts.

Denote conditional error probabilities, given the sample S, by p(S) with four bit-valued subscripts corresponding to $C_Z$, $C_{Z \cup A}$, $C_{Z \cup B}$, and $C_S$, respectively. Value 1 indicates an error, value 0 indicates no error, and value x indicates either. For example, $p_{10x1}(S)$ is the probability that $C_Z$ is incorrect, $C_{Z \cup A}$ is correct, $C_{Z \cup B}$ is either correct or incorrect, and $C_S$ is incorrect for an example drawn at random from the input-output distribution.

Our goal is to develop bounds for $p_{xxx1}(S)$, which is $L_n$, the conditional probability, given the sample S, that $C_S$ is incorrect. The bounds will be probabilistic, based on prob abilities over random drawings of sets of in-sample examples. So our bounds will be of the form:

$$Pr\{p_{xxx1}(S) \geq \upsilon(S)+\epsilon\} \leq c(\epsilon) \qquad (3)$$

where $\upsilon(S)$ is an estimate of $p_{xxx1}(S)=L_n$, $c(\epsilon)$ expresses the certainty of the bound, and $Pr\{\}$ indicates probability over the distribution from which S is drawn.

Note that $$p_{xxx1}(S)=[p_{1xxx}(S)+p_{01xx}(S)-p_{10xx}(S)+p_{0x1x}(S)-p_{1x0x}(S)] \qquad (4)$$

$$+[p_{1000}(S)+p_{1011}(S)+p_{1101}(S)-p_{0010}(S)-p_{0100}(S)-p_{0111}(S)] \qquad (5)$$

$$+[p_{0001}(S)-2p_{0110}(S)+2p_{1001}(S)-p_{1110}(S)] \qquad (6)$$

(To prove this, expand about x's, e.g., $p_{000x}(S)=p_{0001}(S)+p_{0000}(S)$. Then collect terms.)

Define $$p_{est}(S)=p_{1xxx}(S)+p_{01xx}(S)-p_{10xx}(S)+p_{0x1x}(S)-p_{1x0x}(S). \qquad (7)$$

The first term of $p_{est}(S)$ is the error probability of $C_Z$. The next two terms are the difference in error probability between $C_{Z \cup A}$ and $C_Z$. The last two terms are the difference in error probability between $C_{Z \cup B}$ and $C_Z$.

Define $$p_{res}(S)=p_{1000}(S)+p_{1011}(S)+p_{1101}(S)-p_{0100}(S)-p_{0100}(S)-p_{0111}(S). \qquad (8)$$

Define $$p_{zero}(S)=p_{0001}(S)-2p_{0110}(S)+2p_{1001}(S)-p_{1110}(S). \qquad (9)$$

Consider the terms in $p_{zero}(S)$. Since $C_S$ is composed of the examples $Z \cup A \cup B$, it is impossible for $C_S$ to disagree with both $C_{Z \cup A}$ and $C_{Z \cup B}$. (This is a property of the nearest neighbor rule.) Hence, $$p_{0001}(S)=p_{0110}(S)=p_{1001}(S)=p_{1110}(S)=0. \qquad (10)$$

So $$p_{zero}(S)=0. \qquad (11)$$

(Break nearest neighbor ties using randomization, with the same randomizing random variables for all classifiers. That is, when each input is drawn from the input distribution, draw a corresponding random value from the uniform distribution over [0, 1]. If multiple inputs in a classifier have the same distance from an input to be classified, then use the corresponding random values to settle the tie—treat the tied classifier input with the closest random value to the random value for the input to be classified as the nearest neighbor. This tie-breaking method fails, i.e., multiple classifier inputs tie in both the original distance and in the random value, with probability zero. Hence, this case does not affect probability-based bounds. If the random values are computer-generated then the probability that the tie-breaking method fails is nonzero, but extremely small. In case of failure, add another random-valued element to each input, and consult the new element only when there is a tie using the previous element. Add more elements as needed to resolve all ties.)

We will use frequencies to estimate $p_{est}(S)$. Denote the frequency of an error pattern by $f(S)$, with a subscript to indicate the error pattern and a superscript to indicate the samples over which the frequency is measured. For example, $f_{1xxx}^{A \cup B}(S)$ is the error frequency of $C_Z$ over the examples in $A \cup B$.

Since the examples in $A \cup B$ are drawn independently of the examples that form $C_Z$, for each Z, $f_{1xxx}^{A \cup B}(S)|Z$ is the average of $|A \cup B|$ i.i.d. Bernoulli variables, each with mean $p_{1xxx}(S)|Z$, which is a constant value. By Hoeffding's inequality, $$\forall Z: Pr\{p_{1xxx}(S) \geq f_{1xxx}^{A \cup B}(S) + \epsilon | Z\} \leq e^{-2|A \cup B|\epsilon^2}. \quad (12)$$

(Hoeffding's inequality is explained in "Probability Inequalities for Sums of Bounded Random Variables" by W. Hoeffding, published in the American Statistical Association Journal, 1963, pages 13 to 30, and hereby incorporated in its entirety by reference.)

Note that $$Pr\{p_{1xxx}(S) \geq f_{1xxx}^{A \cup B}(S) + \epsilon\} \quad (13)$$

$$= E_z[Pr\{p_{1xxx}(S) \geq f_{1xxx}^{A \cup B}(S) + \epsilon | Z\}]. \quad (14)$$

By Inequality 12, this expectation is:

$$\leq E_z e^{-2|A \cup B|\epsilon^2} = e^{-2|A \cup B|\epsilon^2}. \quad (15)$$

So $$Pr\{p_{1xxx}(S) \geq f_{1xxx}^{A \cup B}(S) + \epsilon\} \leq e^{-2|A \cup B|\epsilon^2}. \quad (16)$$

Similarly, $$Pr\{p_{1xxx}(S) \leq f_{1xxx}^{A \cup B}(S) - \epsilon\} \leq e^{-2|A \cup B|\epsilon^2}. \quad (16)$$

Also, note that $$E_s f_{1xxx}^{A \cup B}(S) \quad (18)$$

$$E_Z[E_{A \cup B} f_{1xxx}^{A \cup B}(S)|Z] \quad (19)$$

$$= E_z p_{1xxx}(S)|Z = E_s p_{1xxx}(S). \quad (20)$$

So $$E_s f_{1xxx}^{A \cup B}(S) = E_s p_{1xxx}(S). \quad (21)$$

Inequalities similar to Inequalities 16 and 17 and equalities similar to Equality 21 hold for the following pairs, each consisting of a frequency and the corresponding term of $p_{est}(S)$.

$$(f_{01xx}^B(S), p_{01xx}(S)), (f_{10xx}^B(S), p_{10xx}(S)), (f_{0x1x}^A(S), p_{0x1x}(S)), \text{ and } (f_{1x0x}^A(S), p_{1x0x}(S)). \quad (22)$$

Define $$f_{est}(S) = f_{1xxx}^{A \cup B}(S) + f_{01xx}^B(S) - f_{10xx}^B(S) + f_{0x1x}^A(S) - f_{1x0x}^A(S). \quad (23)$$

We will use frequencies to estimate a bound for $p_{res}(S)$. For each error pattern in $p_{res}(S)$, there are examples in both A and B that are closer to the input than any example in Z. (This is a property of the nearest neighbor rule.) To illustrate, consider pattern 0010. Since $C_Z \neq C_{Z \cup B}$, there must be an example in B that is closer to the input than any example in Z. Now, since $C_{Z \cup B} \neq C_S$, and $S = Z \cup A \cup B$, there must be an example in A that is closer to the input than any example in $Z \cup B$. Hence, there must be a closer example in A than any example in Z.

Define $p_{AB}(S)$ to be the probability that both A and B have closer examples to a random input than any example in Z. Without reference to the in-sample examples, choose a positive value $|T| < |Z|$. Let set T be composed of the first $|T|$ examples in Z. Define $p_{ABT}(S)$ to be the probability that both A and B have closer examples to a random input than any example in Z–T. Note that $$\forall S: p_{ABT}(S) \geq p_{AB}(S) \geq |p_{res}(S)|. \quad (24)$$

Since, for all S, $p_{xxx1}(S) = p_{res}(S) + p_{res}(S)$, $$\forall S: p_{xxx1}(S) \leq p_{est}(S) + p_{ABT}(S). \quad (25)$$

Let $f_{ABT}(S)$ be the frequency of examples in T that have closer examples in both A and B than any example in Z–T. For all S–T, $f_{ABT}(S)|(S-T)$ is the average of $|T|$ i.i.d. Bernoulli variables, each with mean $p_{ABT}(S)|(S-T)$. By Hoeffding's inequality, $$\forall (S-T): Pr\{p_{ABT}(S) \geq f_{ABT}(S) + \epsilon|(S-T)\} \leq e^{-2|T|\epsilon^2}. \text{tm } (26)$$

A derivation similar to that of Inequality 16 produces the following result.

$$Pr\{p_{ABT}(S) \geq f_{ABT}(S) + \epsilon\} \leq e^{-2|T|\epsilon^2}. \quad (27)$$

A derivation similar to that of Inequality 21 produces the following result.

$$E_s f_{ABT}(S) = E_s p_{ABT}(S). \quad (28)$$

Consider $f_{est}(S) + f_{ABT}(S) + \epsilon$, for some chosen $\epsilon$, as a probabilistic upper bound for $L_n$. Recall that $L_n = p_{xxx1}(S)$. Then $$Pr\{L_n \geq f_{est}(S) + f_{ABT}(S) + \epsilon\} = Pr\{p_{xxx1}(S) \geq f_{est}(S) + f_{ABT}(S) + \epsilon\}. \quad (29)$$

For all S, $p_{xxx1}(S) \leq p_{est}(S) + p_{ABT}(S)$, so the above expressions are $$\leq Pr\{p_{est}(S) + p_{ABT}(S) \geq f_{est}(S) + f_{ABT}(S) + \epsilon\}. \quad (30)$$

Expand $p_{est}(S)$ and $f_{est}(S)$. Then the probability above is $$= Pr\{p_{1xxx}(S) + p_{01xx}(S) - p_{10xx}(S) + p_{0x1x}(S) - p_{1x0x}(S) + p_{ABT}(S) \quad (31)$$

$$\geq f_{1xxx}^{A \cup B}(S) + f_{01xx}^B(S) - f_{10xx}^B(S) + f_{0x1x}^A(S) - f_{1x0x}^A(S) + f_{ABT}(S) + \epsilon\}. \quad (32)$$

Choose positive values $\epsilon_1, \ldots, \epsilon_6$ such that $\epsilon_1 + \ldots + \epsilon_6 = \epsilon$. Use uniform bounds over estimates of individual probabilities by corresponding frequencies. The probability is $$\leq Pr\{(p_{1xxx}(S) \geq f_{1xxx}^{A \cup B}(S) + \epsilon_1) \text{ or } (p_{01xx}(S) \geq f_{01xx}^B(S) + \epsilon_2) \quad (33)$$

$$\text{or } (p_{10xx}(S) \leq f_{10xx}^B(S) - \epsilon_3) \text{ or } (p_{0x1x}(S) \geq f_{0x1x}^A(S) + \epsilon_4) \quad (34)$$

$$\text{or } (p_{1x0x}(S) \leq f_{1x0x}^A(S) - \epsilon_5) \text{ or } (p_{ABT}(S) \geq f_{ABT}(S) + \epsilon_6)\} \quad (35)$$

Bound the probability of the union of events by the sum of the event probabilities. The probability is $$\leq Pr\{p_{1xxx}(S) \geq f_{1xxx}^{A \cup B}(S) + \epsilon_1\} + Pr\{p_{01xx}(S) \geq f_{01xx}^B(S) + \epsilon_2\} \quad (36)$$

$$+ Pr\{p_{10xx}(S) \leq f_{10xx}^B(S) - \epsilon_3\} + Pr\{p_{0x1x}(S) \geq f_{0x1x}^A(S) + \epsilon_4\} \quad (37)$$

$$+ Pr\{p_{1x0x}(S) \leq f_{1x0x}^A(S) - \epsilon_5\} + Pr\{p_{ABT}(S) \geq f_{ABT}(S) + \epsilon_6\} \quad (38)$$

Use a Hoeffding-style bound for each probability. The bound is $$\leq e^{-2|A \cup B|\epsilon_1^2} + e^{-2|B|\epsilon_2^2} + e^{-2|B|\epsilon_3^2} + e^{-2|A|\epsilon_4^2} + e^{-2|A|\epsilon_5^2} + e^{-2|T|\epsilon_6^2}. \quad (39)$$

Hence, for $\epsilon_1 + \ldots + \epsilon_6 = \epsilon$, $$Pr\{L_n \geq f_{est}(S) + f_{ABT}(S) + \epsilon\} \quad (40)$$

$$\leq e^{-2|A \cup B|\epsilon_1^2} + e^{-2|B|\epsilon_2^2} + e^{-2|B|\epsilon_3^2} + e^{-2|A|\epsilon_4^2} + e^{-2|A|\epsilon_5^2} + e^{-2|T|\epsilon_6^2}. \quad (41)$$

To improve the bound, group the terms of $f_{est}(S)$ into two terms instead of the present five terms. One term consists of frequency contributions over A; the other term consists of frequency contributions over B. Define $$f^A(S) = \frac{|A|}{|A \cup B|} f^A_{1xxx}(S) + f^A_{0x1x}(S) - f^A_{1x0x}(S). \tag{42}$$

Define $$f^B(S) = \frac{|B|}{|A \cup B|} f^B_{1xxx}(S) + f^B_{01xx}(S) - f^B_{10xx}(S). \tag{43}$$

Note that $$f_{est}(S) = f^A(S) + f^B(S). \tag{44}$$

Also, define $$p^A(S) = \frac{|A|}{|A \cup B|} p_{1xxx}(S) + p_{0x1x}(S) - p_{1x0x}(S), \tag{45}$$

and define $$p^B(S) = \frac{|B|}{|A \cup B|} p_{1xxx}(S) + p_{01xx}(S) - p_{10xx}(S). \tag{46}$$

Note that $$p_{est}(S) = p^A(S) + p^B(S). \tag{47}$$

Inequalities similar to Inequalities 16 and 17 relate the pairs $(f^A(S), p^A(S))$ and $(f^B(S), p^B(S))$. Let $a_i$ be the contribution of the ith example in A to $f^A(S)|(S-A)$. Then $$a_i = \begin{cases} 0 & \text{if } C_Z \text{ is correct and } C_{Z \cup B} \text{ is correct} \\ \frac{1}{|A|} & \text{if } C_Z \text{ is correct and } C_{Z \cup B} \text{ is incorrect} \\ \frac{1}{|A|+|B|} - \frac{1}{|A|} & \text{if } C_Z \text{ is incorrect and } C_{Z \cup B} \text{ is correct} \\ \frac{1}{|A|+|B|} & \text{if } C_Z \text{ is incorrect and } C_{Z \cup B} \text{ is incorrect} \end{cases} \tag{48}$$

Note that each $a_i$ has range $$\left[ \frac{1}{|A|+|B|} - \frac{1}{|A|}, \frac{1}{|A|} \right].$$

Since $f^A(S)|(S-A)$ is the average of i.i.d. variables $a_1, \ldots, a_{|A|}$, each with mean $p^A(S)|(S-A)$, by Hoeffding's inequality, $$\forall (S-A): Pr\{p^A(S) \geq f^A(S) + \epsilon|(S-A)\} \leq e^{-2|A|\epsilon^2 / \left(2 - \frac{|A|}{|A|+|B|}\right)^2} \tag{49}$$

Taking the expectation over S–A yields the following bound for the probability over S.

$$Pr\{p^A(S) \geq f^A(S) + \epsilon\} \leq e^{-2|A|\epsilon^2 / \left(2 - \frac{|A|}{|A|+|B|}\right)^2}. \tag{50}$$

Similarly, $$Pr\{p^B(S) \geq f^B(S) + \epsilon\} \leq e^{-2|B|\epsilon^2 / \left(2 - \frac{|A|}{|A|+|B|}\right)^2}. \tag{51}$$

Following the process to derive Inequality 41, $$Pr\{L_n \geq f_{est}(S) + f_{ABT}(S) + \epsilon\} \tag{52}$$

$$\leq Pr\{p^A(S) + p^B(S) + p_{ABT}(S) \geq f^A(S) + f^B(S) + f_{ABT}(S) + \epsilon\}. \tag{53}$$

Choose positive quantities $\epsilon_A$, $\epsilon_B$, and $\epsilon_T$ such that $\epsilon_A + \epsilon_B + \epsilon_T = \epsilon$. Then the above expression is $$\leq Pr\{p^A(S) \geq f^A(S) + \epsilon_A\} + Pr\{p^B(S) \geq f^B(S) + \epsilon_B\} + Pr\{p_{ABT}(S) \geq f_{ABT}(S) + \epsilon_T\}. \tag{54}$$

By the Hoeffding bounds, this is $$\leq e^{-2|A|\epsilon_A^2 / \left(2 - \frac{|A|}{|A|+|B|}\right)^2} + e^{-2|B|\epsilon_B^2 / \left(2 - \frac{|B|}{|A|+|B|}\right)^2} + e^{-2|T|\epsilon_T^2}. \tag{55}$$

So $$Pr\{L_n \geq f_{est}(S) + f_{ABT}(S) + \epsilon\} \tag{56}$$

$$\leq e^{-2|A|\epsilon_A^2 / \left(2 - \frac{|A|}{|A|+|B|}\right)^2} + e^{-2|B|\epsilon_B^2 / \left(2 - \frac{|B|}{|A|+|B|}\right)^2} + e^{-2|T|\epsilon_T^2}. \tag{57}$$

To derive a similar lower bound, recall that for all $S$, $L_n = p_{est}(S) + p_{res}(S)$ and $p_{ABT}(S) \geq |p_{res}(S)|$. So $$\forall S: L_n \leq p_{est}(S) - p_{ABT}(S), \tag{58}$$

and the probabilistic lower bound for $L_n$ is as follows.

$$Pr\{L_n \leq f_{est}(S) - f_{ABT}(S) - \epsilon\} \tag{59}$$

$$\leq e^{-2|A|\epsilon_A^2 / \left(2 - \frac{|A|}{|A|+|B|}\right)^2} + e^{-2|B|\epsilon_B^2 / \left(2 - \frac{|B|}{|A|+|B|}\right)^2} + e^{-2|T|\epsilon_T^2}. \tag{60}$$

Combine the upper and lower bounds to form the following two-sided bound.

$$Pr\{(f_{est}(S) - L_n) \notin [-f_{ABT}(S) - \epsilon, f_{ABT}(S) + \epsilon]\} \tag{61}$$

$$\leq 2 \left[ e^{-2|A|\epsilon_A^2 / \left(2 - \frac{|A|}{|A|+|B|}\right)^2} + e^{-2|B|\epsilon_B^2 / \left(2 - \frac{|B|}{|A|+|B|}\right)^2} + e^{-2|T|\epsilon_T^2} \right]. \tag{62}$$

It will be apparent to those skilled in the art that the bounds can be optimized through choices of $|A|$, $|B|$, $|T|$, $\epsilon_A$, $\epsilon_B$, $\epsilon_T$.

To review, the algorithm to compute the two-sided bounds is summarized below.

1. Read in S, the set of in-sample examples. Read in sizes for subsets of S:

$|V|$, $|A|$, $|B|$, and $|T|$. Also read in $\epsilon_A$, $\epsilon_B$, and $\epsilon_T$. Set $\epsilon$ to $\epsilon_A + \epsilon_B + \epsilon_T$.

2. Partition set S into a validation set V and a remaining set Z.

3. Partition set V into sets A and B.

4. Use Equation 23 to compute the frequency-based error estimate $f_{est}(S)$.

5. Partition set Z into sets T and Z–T.

6. Compute $f_{ABT}(S)$, which is the frequency of examples in T that have closer examples in both A and B than any example in Z–T.

7. Substitute the values for $f_{est}(S)$, $f_{ABT}(S)$, $|A|$, $|B|$, $|T|$, $\epsilon$, $\epsilon_A$, $\epsilon_B$, and $\epsilon_T$ into Inequality 61 and 62, simplify terms, and return the result as a probabilistic bound on the expected error rate.

It will be apparent to those skilled in the art of computer programming that the above algorithm, as well as similar algorithms for one-sided bounds, may be implemented using a computer system that includes the following components.

A computer comprising a memory device and a central processing unit (CPU)

application software (comprising programs to accomplish the following means)

means to read a set of in-sample examples into the memory device of the computer means to specify a partition of the in-sample examples into a validation set and a remaining set means to specify a partition of the validation set into two holdout sets, a first holdout set and a second holdout set means to compute the frequency, over the validation set, of inputs for which the classifier based on the remaining set is incorrect means to compute the difference in two frequencies over the second holdout set, the first frequency being of inputs for which the classifier based on the remaining set is correct but the classifier based on both the remaining set and the first holdout set is incorrect, the second frequency being of inputs for which the classifier based on the remaining set is incorrect but the classifier based on both the remaining set and the first holdout set is correct means to compute the difference in two frequencies over the first holdout set, the first frequency of inputs for which the classifier based on the remaining set is correct but the classifier based on both the remaining set and the second holdout set is incorrect, the second frequency of inputs for which the classifier based on the remaining set is incorrect but the classifier based on both the remaining set and the second holdout set is correct.

means to specify a partition of the remaining set into a core set and a non-core set means to compute the frequency, over the non-core set, of inputs with at least one closer input in each holdout set than the closest input in the core set The methods to construct these components and combine them into a system that computes bounds will be apparent to those skilled in the art of computer programming.

Unlabelled Inputs and Test Inputs

Let D be a set of inputs drawn i.i.d. from the input distribution. Define $f_{AB}{}^D(S \cup D)$ to be the frequency over inputs in D with which both A and B have examples closer to the input than any example in Z. Since $$E_S f_{AB}^D(S \cup D) = p_{AB}(S), f_{AB}^D(S \cup D)$$

can be used in place of $f_{ABT}(S)$ in the bounds, replacing $|T|$ by $|D|$. If it is possible to produce as many inputs as desired, then $p_{AB}(S)$ can be estimated with arbitrary accuracy and confidence.

It will be apparent to those skilled in the art of computer programming that the bound-producing algorithms may be augmented through the use of set D by using a computer system with components as specified previously and augmented with the following components.

means to read a set of unlabelled inputs into the memory device of the computer means to compute the frequency, over the unlabelled inputs, of inputs with at least one closer input in each holdout set than the closest input in the remaining set.

If only a few unlabelled inputs are available, then $p_{ABT}(S)$ should be estimated using both unlabelled inputs and in-sample examples, as follows. Let $f_{ABT}{}^{DUT}(S \cup D)$ be the frequency over inputs in $D \cup T$ with which both A and B have examples closer to the input than any input in Z–T. Since $(E_s f_{ABT}{}^{DUT}(S \cup D) = p_{ABT}(S), f_{ABT}{}^{DUT}(S \cup D)$ can be used in place of $f_{ABT}(S)$ in the bounds, replacing $|T|$ by $|D \cup T|$.

It will be apparent to those skilled in the art of computer programming that the bound-producing algorithms may be augmented through the use of set $D \cup T$ by using a computer system with the previously specified components and augmented with the following component.

means to compute the frequency, over the unlabelled inputs and non-core inputs, of inputs with at least one closer input in each holdout set than the closest input in the core set.

Now suppose that we wish to bound the test error rate over a set of available test inputs Q drawn i.i.d. from the input distribution, i.e., we wish to bound $f_{xxx1}{}^Q(S \cup Q)$. As an analog to $p_{est}(S)$, define $$f_{est}{}^Q(S \cup Q) = f_{1xxx}{}^Q(S \cup Q) + f_{01xx}{}^Q(S \cup Q) - f_{10xx}{}^Q(S \cup Q) + f_{0x1x}{}^Q(S \cup Q) - f_{1x0x}{}^Q(S \cup Q). \tag{63}$$

Note that $E_{S \cup Q} f_{est}(S) = E_{S \cup Q} f_{est}{}^Q(S \cup Q)$. By Inequality (2.7) of the paper by Hoeffding, $$Pr\{f_{est}{}^Q(S \cup Q) \geq f_{est}(S) + \epsilon\} \tag{64}$$

$$\leq e^{-2\epsilon_A^2/(|A|^{-1}+|Q|^{-1})(2-\frac{|A|}{|A|+|B|})^2} + e^{-2\epsilon_B^2/(|B|^{-1}+|Q|^{-1})(2-\frac{|B|}{|A|+|B|})^2} \tag{65}$$

where $\epsilon = \epsilon_A + \epsilon_B$ and the probability is over the distribution of $S \cup Q$. Define $f_{AB}{}^Q(S \cup Q)$ to be the frequency with which test inputs have closer examples in both A and B than any example in Z. Since the test inputs are known, $f_{AB}{}^Q(S \cup Q)$ can be computed exactly. Note that $$\forall (S \cup Q): f_{est}{}^Q(S \cup Q) + f_{AB}{}^Q(S \cup Q) \geq f_{xxx1}{}^Q(S \cup Q). \tag{66}$$

Hence, we have the following upper bound on test error rate.

$$Pr\{f_{xxx1}{}^Q(S \cup Q) \geq f_{est}(S) + f_{AB}{}^Q(S \cup Q) + \epsilon\} \tag{67}$$

$$\leq e^{-2\epsilon_A^2/(|A|^{-1}+|Q|^{-1})(2-\frac{|A|}{|A|+|B|})^2} + e^{-2\epsilon_B^2/(|B|^{-1}+|Q|^{-1})(2-\frac{|B|}{|A|+|B|})^2} \tag{68}$$

where the probability is over the distribution of $S \cup Q$.

I claim:

1. A system comprising:

a computer comprising a memory device and a central processing unit (CPU);

application software;

means to read a set of in-sample examples into the memory device of the computer;

means to specify a partition of the in-sample examples into a validation set and a remaining set;

means to specify a partition of the validation set into two holdout sets, a first holdout set and a second holdout set;

means to compute the frequency, over the validation set, of inputs for which the classifier based on the remaining set is incorrect;

means to compute the difference in two frequencies over the second holdout set, the first frequency being of inputs for which the classifier based on the remaining set is correct but the classifier based on both the remaining set and the first holdout set is incorrect, the second frequency being of inputs for which the classifier based on the remaining set is incorrect but the classifier based on both the remaining set and the first holdout set is correct; and means to compute the difference in two frequencies over the first holdout set, the first frequency of inputs for which the classifier based on the remaining set is correct but the classifier based on both the remaining set and the second holdout set is incorrect, the second frequency of inputs for which the classifier based on the remaining set is incorrect but the classifier based on both the remaining set and the second holdout set is correct.

2. The system as recited in claim 1, further comprising:

means to specify a partition of the remaining set into a core set and a non-core set; and means to compute the frequency, over the non-core set, of inputs with at least one closer input in each holdout set than the closest input in the core set.

3. The system as recited in claim 1, further comprising:

means to read a set of unlabelled inputs into the memory device of the computer; and means to compute the frequency, over the unlabelled inputs, of inputs with at least one closer input in each holdout set than the closest input in the remaining set.

4. The system as recited in claim 1, further comprising:

means to specify a partition of the remaining set into a core set and a non-core set;

means to read a set of unlabelled inputs into the memory device of the computer; and means to compute the frequency, over the unlabelled inputs and non-core inputs, of inputs with at least one closer input in each holdout set than the closest input in the core set.

* * * * *